United States Patent [19]
Bibby et al.

[11] Patent Number: 5,308,560
[45] Date of Patent: May 3, 1994

[54] PROCESS FOR PRODUCING MOULDINGS FROM AN EXPANDED STYRENE POLYMER

[75] Inventors: Norman W. Bibby; Oskar L. Willi, both of Northampton, United Kingdom

[73] Assignee: M. Y Trondex Limited, Northampton, United Kingdom

[21] Appl. No.: 892,604

[22] Filed: May 29, 1992

Related U.S. Application Data

[63] Continuation of Ser. No. 527,648, May 16, 1990, abandoned, which is a continuation of Ser. No. 314,389, Feb. 23, 1989, abandoned.

[51] Int. Cl.⁵ .................................................. B29C 67/22
[52] U.S. Cl. ............................................ 264/50; 264/51; 264/DIG. 10
[58] Field of Search ................ 264/41, 45.4, 50, 51, 264/53, DIG. 9, DIG. 10

[56] References Cited

U.S. PATENT DOCUMENTS

| | | | |
|---|---|---|---|
| 3,116,349 | 12/1963 | Immel | 264/45.4 |
| 3,255,286 | 6/1966 | Luc-Belmont et al. | |
| 3,328,497 | 6/1967 | Baxter et al. | 264/53 |
| 3,504,068 | 3/1970 | Zizlsperger | 264/41 |
| 3,859,404 | 1/1975 | Immel et al. | |
| 4,240,998 | 12/1980 | Lichter et al. | 264/45.4 |
| 4,415,680 | 11/1983 | Ushirokawa et al. | |
| 4,685,872 | 8/1987 | Erlenbach | 264/51 |
| 4,810,440 | 3/1989 | Yoshida et al. | 264/DIG. 9 |
| 4,818,451 | 4/1989 | Arai et al. | 264/DIG. 10 |
| 4,822,542 | 4/1989 | Kuwabara et al. | 264/DIG. 9 |

FOREIGN PATENT DOCUMENTS

| | | | |
|---|---|---|---|
| 0177621 | 10/1984 | European Pat. Off. | |
| 0238684 | 11/1988 | European Pat. Off. | 264/45.4 |
| 0288634 | 11/1988 | European Pat. Off. | 264/45.4 |
| 3214907A1 | 10/1983 | Fed. Rep. of Germany | |
| 3422675A1 | 12/1985 | Fed. Rep. of Germany | |
| 6924429 | 3/1970 | France | |
| 2013196 | 5/1970 | France | |
| 2464282 | 4/1981 | France | 264/45.4 |
| 10878780 | 7/1981 | Japan | |
| 8503903 | 9/1985 | PCT Int'l Appl. | |
| 884896 | 12/1961 | United Kingdom | |
| 1176238 | 1/1970 | United Kingdom | |
| 1265846 | 3/1972 | United Kingdom | |
| 1560630 | 6/1980 | United Kingdom | |

Primary Examiner—Allan R. Kuhns
Attorney, Agent, or Firm—Lorusso & Loud

[57] ABSTRACT

A process for producing a moulding from an expanded styrene polymer. This process comprises applying gas pressure to particles of the polymer, introducing the particles under pressure into a mould, and reducing the pressure to allow at least some of the particles to expand in the mould and bond together to form the moulding.

13 Claims, 1 Drawing Sheet

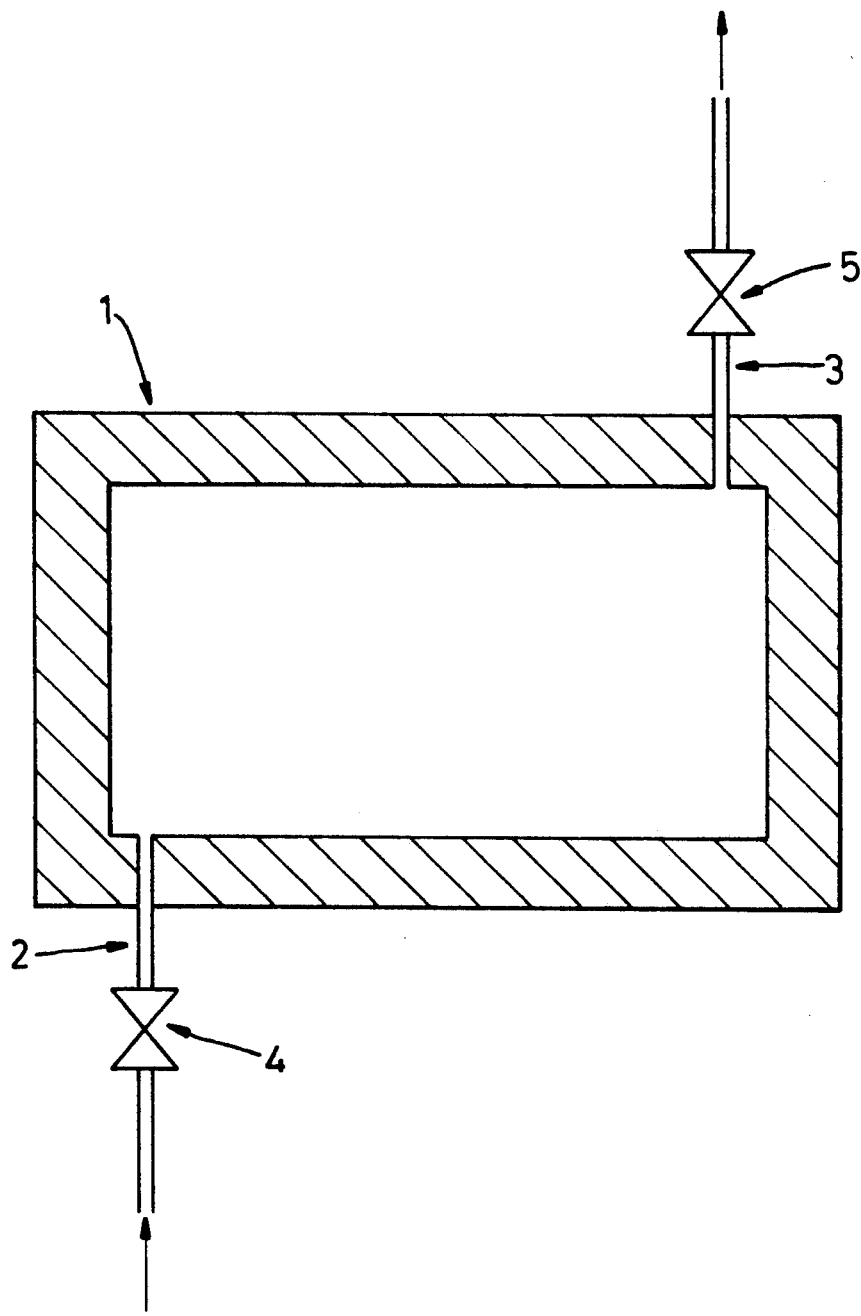

PROCESS FOR PRODUCING MOULDINGS FROM AN EXPANDED STYRENE POLYMER

BACKGROUND

This is a continuation of application(s) Ser. No. 07/527,648 filed on May 16, 1990, now abandoned, which is a continuation of U.S. patent application Ser. No. 314,389, filed Feb. 23, 1989, now abandoned.

This invention relates to a process for producing mouldings from an expanded styrene polymer.

Mouldings of expanded polymers are used in a variety of applications, such as packaging and insulation. Typical examples of the types of polymers used are expanded polystyrene and polyethylene. Polystyrene is more generally used than polyethylene and it is less expensive. However, there are occasions when polyethylene is preferred since it is more elastic and performs better in drop tests than polystyrene.

Production of polystyrene mouldings is generally carried out by introducing particles of expanded polystyrene containing an expanding agent into a mould. The mould and/or the contents are then heated to cause the particles to expand and fuse together to form a moulding.

Mouldings of elastified polystyrene can be produced by calendering or compressing expanded polystyrene into a desired shape. However, the properties of elastified polystyrene fall short of those of polyethylene and the process is more complex than the process for the production of expanded polystyrene.

Patent No. EP0177621 discloses a process for producing a laminated board from polystyrene, where one layer has been elastified by compression.

Generally the moulding techniques described above for polystyrene are not suitable for the production of polyethylene mouldings. Patent No. GB 1201800 of BASF discloses a process for the production of polyolefin mouldings. In this process, expanded olefin polymers are compressed in a container by forcing in a gas. The pressure is reduced in a mould to allow the particles to expand and bond together to form a moulding. The application of heat or the use of an adhesive causes the particles to bond together.

It is an object of this invention to provide a process for producing mouldings from an expanded styrene polymer, whereby the mouldings produced are stronger and possess improved characteristics of elastification than previous mouldings.

It is a further object of this invention to provide a process for achieving elastification in polystyrene which is simpler than previous processes.

In accordance with this invention there is provided a process for producing mouldings from an expanded styrene polymer comprising applying gas pressure to particles of said polymer, introducing the particles under pressure into a mould, and reducing the pressure to allow at least some of the particles to expand in the mould and bond together to produce the moulding.

The styrene polymer may be a homopolymer or a copolymer containing at least 10%, preferably 25% and more preferably 50% styrene.

The particles may be introduced into the mould until the mould is filled to a predetermined extent or a predetermined volume of particles may be introduced into the mould.

Heat may be applied to cause the particles to bond together. Desirably, heat is applied to raise the temperature of the surface of at least some of the particles to cause a desired degree of coherence in the moulding.

Conveniently heat is applied to the particles in the form of steam. Preferably, the temperature of the steam is in the range of 90°–127° C., and more preferably, in the range of 90°–117° C.

In one embodiment of this invention the particles are heated so that they expand under the influence of residual expanding agent to form a moulding.

In another embodiment, the particles are heated under pressure and the pressure released so that the particles expand to form a moulding.

The particles preferably have a density in the range of 5 to 100 grams/liter, more preferably 5 to 75 grams/liter, and most preferably 5 to 20 grams/liter.

BRIEF DESCRIPTION OF THE DRAWING

Reference is now made to the accompanying drawing which presents a schematic diagram of apparatus for use in accordance with this invention.

DETAILED DESCRIPTION OF THE INVENTION

A mould 1 is provided with an inlet 2 and an outlet 3. The inlet 2 is provided with a valve 4, and the outlet 3 is provided with a valve 5. The outlet 3 can be provided with a pressure regulator (not shown) instead of, or as well as, the valve 5. At the start of the process the valves 4 and 5 are closed.

In one embodiment, the valve 4 is opened and particles are introduced into the mould via the inlet 2. The particles are fed to the mould 1 under air pressure. The air pressure can be sufficient to compress the particles to about twice their density at atmospheric pressure. However, lower pressures can be used which compress the particles by only about 10%. It is usual to apply sufficient pressure to compress the particles by 20 to 30%. As soon as a desired volume of particles has been introduced into the mould, the valve 4 is closed.

The valve 5 is opened to allow the gas to be released via the outlet 3 so that the pressure within the mould is reduced to atmospheric pressure. This allows the particles within the mould to expand.

Steam is applied at a temperature of 90°–117° C. in a conventional manner to cause the particles, which may contain residual expanding agent, to expand. The temperature of the surface of at least some of the particles is raised to fuse the particles together to form a coherent moulding.

The mould 1 is allowed to cool and the moulding is removed from the mould so the process can be repeated.

In another embodiment the particles are introduced into the mould 1 via the inlet 2 and compressed by means of pressurised steam. This causes the temperature of the surface of the particles to be raised.

The pressure is then released via the outlet 3 as above to allow the particles to expand, the surface temperature of the particles being such that they fuse together to produce a coherent moulding. The mould 1 is then allowed to cool as above so that the moulding can be removed.

In a further embodiment, the particles are compressed by air pressure and introduced into the mould 1, via the inlet 2, in the compressed state. The valve 4 is then closed and the air is replaced by steam at temperatures stated above in such a way that the pressure within the mould 1 is maintained substantially constant.

The steam causes the temperature of the surface of the particles to be raised so that they fuse together. The steam is then released via the outlet 3 as above, to allow the particles to expand and so complete the fusion to form a coherent moulding. The mould 1 is then allowed to cool as above so that the moulding can be removed.

This method can be used with scrap material and with particles containing no expanding agent.

The following examples are descriptions of actual working conditions of the process.

EXAMPLE 1

Particles of pre-expanded polystyrene having a density of between 7 and 20 grams/liter are compressed by air pressure to about 30–50% of their original volume.

The compressed particles are then introduced under pressure into the mould until the mould is filled. The air is then released via an air exhaust valve and steam introduced at a temperature of 104° C. The particles then fuse together to form the moulding and when the mould is cooled, the moulding is removed.

EXAMPLE 2

Particles having a density as described in example 1 are compressed by air pressure by the same amount as described in example 1.

The compressed particles are then introduced under pressure into the mould until the mould is filled. The air is then released via an air exhaust valve and steam introduced at a pressure equivalent to a temperature of 104° C. The particles then fuse together to form the moulding and when the mould is cooled, the moulding is removed.

It is an advantage of this invention that it provides a process for producing mouldings of elastified styrene polymers that is simpler than previous processes.

It is a further advantage that the elastified moulding produced perform better in drop tests than previous mouldings of polystyrene or polyolefins.

We claim:

1. A non-calendering, non-compression molding, expansion process for producing a moulding from a pre-expanded styrene polymer, said process comprising:
    applying gas pressure to particles of a pre-expanded styrene polymer substantially free of residual expanding agent sufficient to compress the particles to a volume of 90% of the original volume or less than 90% of the original volume;
    introducing the particles into a mould; and
    modifying the gas pressure inside the mould, without modifying mould volume, to allow said particles to expand in the mould and bond together to produce the moulding.

2. A process according to claim 1 wherein the styrene polymer is a homopolymer.

3. A process according to claim 1 wherein the styrene polymer is a copolymer.

4. A process according to claim 3 wherein the copolymer contains at least 10% styrene.

5. A process according to claim 3 wherein the copolymer contains at least 25% styrene.

6. A process according to claim 3 wherein the copolymer contains at least 50% styrene.

7. A process according to claim 1 wherein heat is applied to raise the temperature of at least some of the particles to cause a desired degree of coherence in the moulding.

8. A process according to claim 1 wherein heat is applied in the form of steam at a temperature in the range of 90° to 127° C.

9. A process according to claim 1 wherein heat is applied in the form of steam at a temperature in the range of 90° to 117° C.

10. A process according to claim 1 wherein a predetermined amount of particles is introduced into the mould.

11. A non-calendering, non-compression molding, expansion process for producing a moulding from a pre-expanded styrene polymer, said moulding process comprising:
    applying gas pressure to particles of a pre-expanded styrene polymer substantially free of residual expanding agent sufficient to compress the particles to a volume of 90% of the original volume or less than 90% of the original volume;
    wherein said particles have a density in the range of from 5 to less than 10 grams/liter prior to applying said gas pressure;
    introducing the particles into a mould; and
    modifying the gas pressure inside the mould, without modifying mould volume, to allow said particles to expand in the mould and bond together to produce a moulding.

12. The process of claim 11 wherein the applying of said gas pressure to particles of a styrene polymer is sufficient to compress the particles to about 70 to 50% of their original volume.

13. A non-calendering, non-compression molding, expansion process for producing an elastified moulding from a pre-expanded styrene polymer, said elastifying molding process comprising:
    applying gas pressure to particles of a pre-expanded styrene polymer substantially free of residual expanding agent sufficient to compress the particles to a volume of 90% of the original volume or less than 90% of the original volume;
    introducing the particles into a mould; and
    modifying the gas pressure inside the mould to allow said particles to expand and elastify in the mould and bond together to produce the elastified moulding.

* * * * *